US008507843B2

(12) United States Patent
Silny et al.

(10) Patent No.: US 8,507,843 B2
(45) Date of Patent: Aug. 13, 2013

(54) METHOD AND SYSTEM FOR SPECTRAL CALIBRATION OF A REMOTE SENSING SENSOR AND A SYNTHETIC TARGET HAVING A TUNABLE SPECTRAL COMPOSITION

(75) Inventors: John F. Silny, Playa Del Rey, CA (US); Stephen J. Schiller, La Mirada, CA (US)

(73) Assignee: Raytheon Company, Waltham, MA (US)

( * ) Notice: Subject to any disclaimer, the term of this patent is extended or adjusted under 35 U.S.C. 154(b) by 38 days.

(21) Appl. No.: 13/112,591

(22) Filed: May 20, 2011

(65) Prior Publication Data
US 2012/0292494 A1    Nov. 22, 2012

(51) Int. Cl.
*G01D 18/00*   (2006.01)
(52) U.S. Cl.
USPC ........................................... 250/252.1
(58) Field of Classification Search
USPC ........................................... 250/252.1
See application file for complete search history.

(56) References Cited

U.S. PATENT DOCUMENTS

| | | | |
|---|---|---|---|
| 5,371,358 A * | 12/1994 | Chang et al. | 250/226 |
| 5,556,058 A * | 9/1996 | Bender | 244/171 |
| 7,298,484 B2 * | 11/2007 | Chen et al. | 356/416 |
| 2010/0032557 A1 * | 2/2010 | Schiller | 250/252.1 |
| 2011/0024612 A1 * | 2/2011 | Mintz et al. | 250/252.1 |

* cited by examiner

*Primary Examiner* — Marcus Taningco
(74) *Attorney, Agent, or Firm* — Pierce Atwood LLP; Joseph M. Maraia

(57) ABSTRACT

A method and a system for spectral calibration of a remote sensing sensor and a synthetic target having a tunable spectral composition are described. The system or synthetic target includes a plurality of reflective mirrors arranged to reflect radiation from a source of radiation onto a remotely located radiation sensor. A first mirror in the plurality of mirrors is configured to reflect a first portion of the radiation in a first wavelength toward the remotely located radiation sensor. A second mirror in the plurality of mirrors is configured to reflect a second portion of the radiation in a second wavelength different from the first wavelength toward the remotely located radiation sensor. The first portion of the radiation and the second portion of the radiation can be selected to calibrate the remotely located radiation sensor so as to provide a quantitative spectral relationship between the radiation detected at the remotely located sensor and the radiation reflected by the plurality of mirrors.

36 Claims, 12 Drawing Sheets

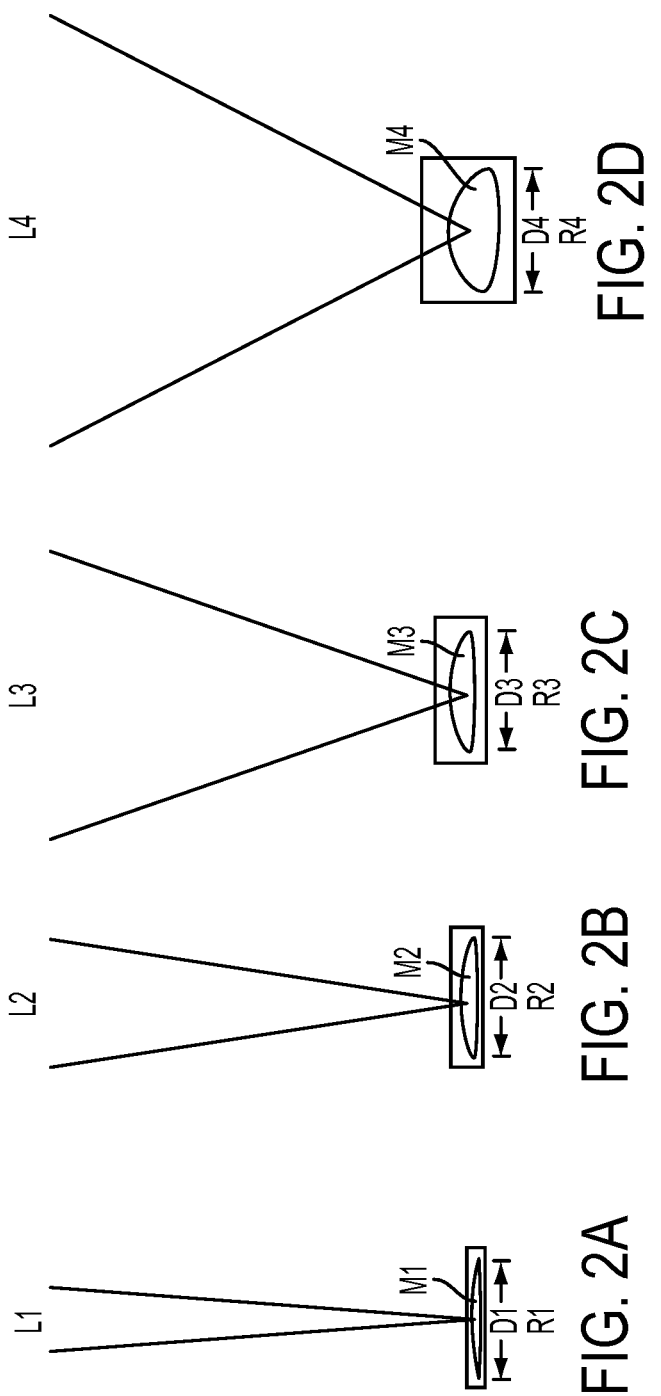

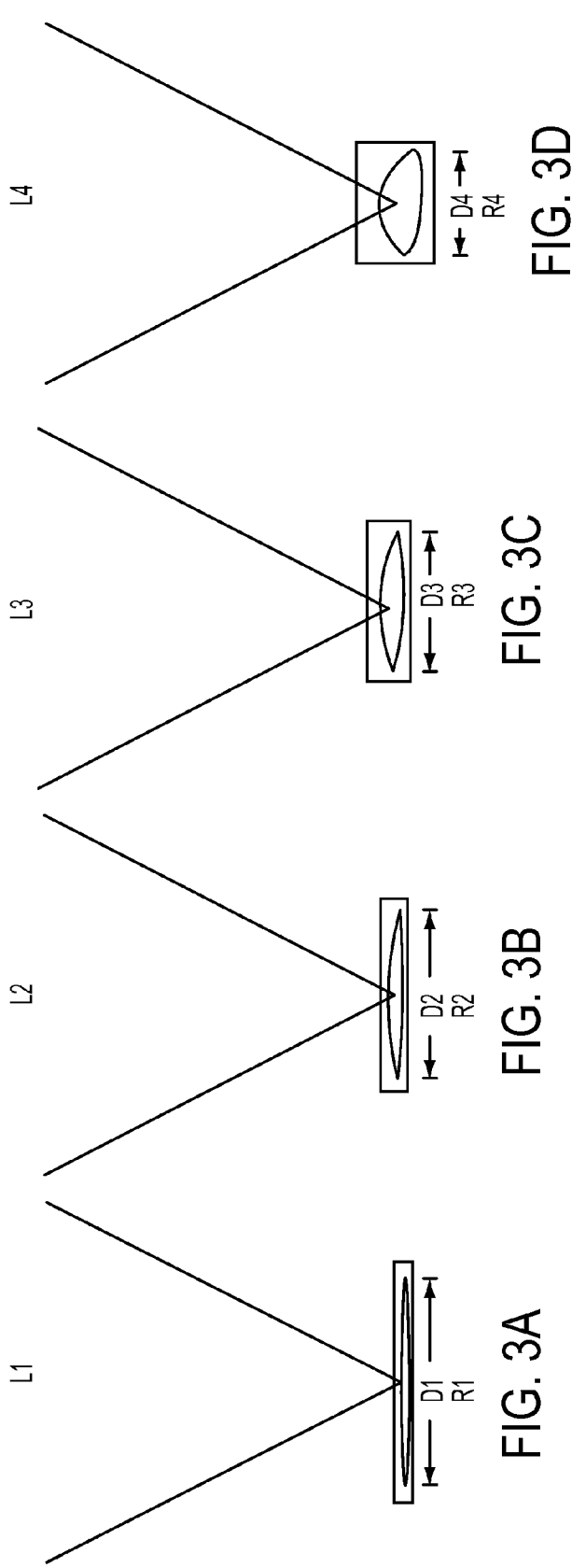

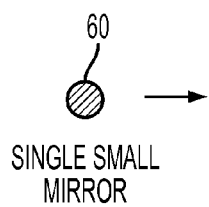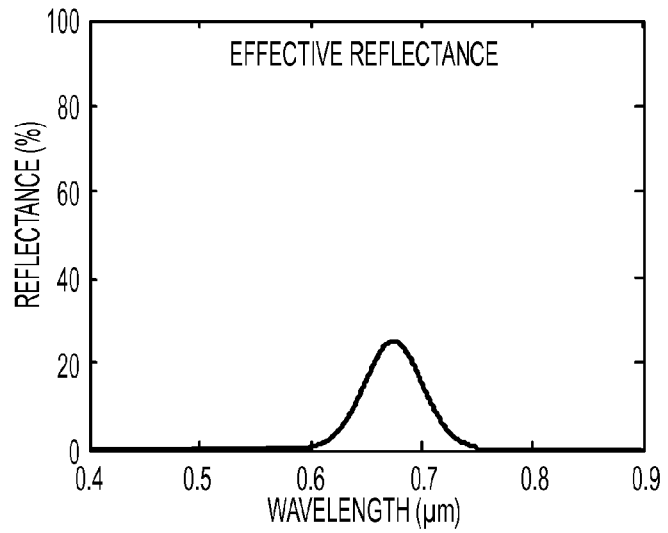
FIG. 6A
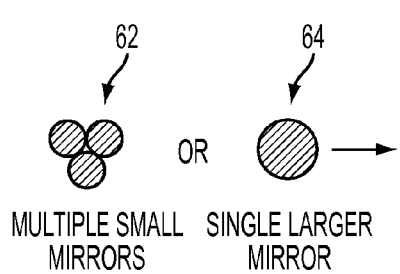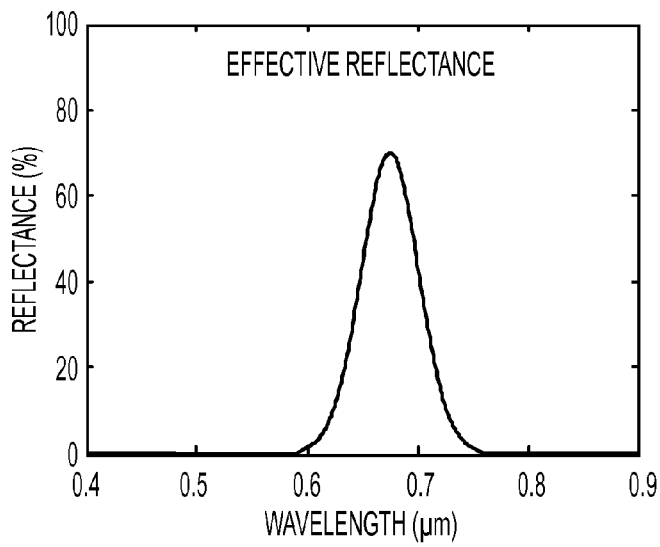
FIG. 6B

METHOD AND SYSTEM FOR SPECTRAL CALIBRATION OF A REMOTE SENSING SENSOR AND A SYNTHETIC TARGET HAVING A TUNABLE SPECTRAL COMPOSITION

BACKGROUND

This disclosure pertains generally to calibration and in particular pertains to a method and system for spectral calibration of a remote sensing sensor and a synthetic target having a tunable spectral composition.

Airborne, and space-borne remote sensing systems for geospatial survey, observation, target recognition, and other applications are increasing in use. For example, the remote sensing systems may be employed to detect anthropogenic and natural effects in climate change, geologic morphology and chemistry, hydrology, vegetation health, as well as to identify and distinguish between friend and foe military targets (target recognition), drug operations, terrorist activities, damage assessment, and emergency routes for responding to natural disasters.

In order for the remote sensing system to operate as intended to quantify physical properties of an observed object, image data obtained by the remote sensing system and the physical properties of the observed object are quantitatively linked. Thus, providers of remote sensing systems strive to provide adequate methods for addressing stability and accuracy requirements imposed by the user community to define and validate sensor spectral, spatial, and radiometric performance, and in turn establish the level of confidence for data exploitation.

Development of monochromatic and multispectral sensing systems continue to move toward increasing spatial resolution in response to the fact that most targets of interest are contained in only a few pixels or even sub-pixel (i.e., an image area of the target is less than a pixel area). Generally, each image is composed of a plurality of pixels, with the radiation sensed by each pixel analyzed to determine the physical content and make up of the target contained in a pixel area. However, for small targets, blur spots due to optical diffraction, electronic readout, sensor motion, atmospheric scattering, or any combination thereof, as well as other potential natural phenomena or technical issues, can smear light into nearby pixels spatially disconnected from the target and thus blur the image of the object. Multispectral and hyperspectral sensors collect image data across a plurality (e.g., tens to hundreds) of spectral bands in which the blurring or smearing effect can vary with wavelength.

As a result, knowledge of the spatial performance (i.e., sensor point spread function) is applied as part of a calibration process so as to achieve effective small targets. Hence, one element in the operation of airborne and space-borne imaging systems is sensor calibration on the ground before launch or flight. However, physical conditions within the imaging system or conditions in the atmosphere between the imaging system and the desired target or object may change from the calibration laboratory setting in such a way so as to skew the calibration values. Therefore, the sensor calibration on the ground in the laboratory becomes suspect until validated after deployment of the sensor. The validation of the calibration after sensor deployment or vicarious calibration of the sensor provides an absolute calibration of the sensor to ensure validity of the laboratory or ground based calibration or to correct the laboratory calibration to take into account conditions that may have occurred after deployment of the sensor.

Current vicarious calibration methods generally involve large surfaces of known reflectance, either natural targets (desert dry lake bed playa or uniform grass fields) or man-made (tarps or diffuse panels) targets. Natural targets have an unstable reflectance with significant bi-directional effects and generally provide only one light flux level for each calibration collection. Man-made diffuse reflectance targets provide better control of reflectance properties and multiple flux levels but, in order to be useful, must still be large, filling many pixels (typically on the scale of twenty to fifty meters or more). Man-made diffuse reflectance targets can be cumbersome to set out requiring an extensive support team for deployment and maintenance. In addition, both techniques require a broad range of ground truth measurements that characterize target and atmospheric optical properties at the time of the overpass for radiometric calibration. Furthermore, conventional vicarious calibration methods and systems are limited to calibrating radiometric properties of airborne, and space born remote sensing systems. These conventional vicarious methods and systems do not take into account the spectral dimension of the target since the calibration targets are generally spectrally flat. In addition, in these conventional vicarious methods, it is assumed that the spectral response function of the sensor is accurately known, and there is no significant spectral mixing with the background, both of which may be untrue.

Once calibrated, the performance of the sensor in detecting targets of interest through exploitation of their spectral properties generally requires validation. Effective validation would include looking at targets under a range of background contrasts, environmental settings, and atmospheric conditions. In addition, validation against targets that are difficult to reproduce, dangerous to handle or sensitive to national security create significant challenges in a effort to deploy for validation, all of which can be cost and effort inhibitive. Thus, it is desirable to provide the capability to put in their place surrogate targets with identical spectral properties, but those that are easy to deploy, which has many benefits.

Hence, there is a need in the art for a system and method of spectral calibration and validation of remote sensing systems and there is a need in the art for synthetic targets having tunable spectral composition.

SUMMARY

One or more embodiments of the present disclosure provide a system for spectral calibration of a remote sensing sensor. The system includes a plurality of reflective mirrors arranged to reflect radiation from a source of radiation onto a remotely located radiation sensor. A first mirror in the plurality of mirrors is configured to reflect a first portion of the radiation in a first wavelength toward the remotely located radiation sensor. A second mirror in the plurality of mirrors is configured to reflect a second portion of the radiation in a second wavelength different from the first wavelength toward the remotely located radiation sensor. The first portion of the radiation and the second portion of the radiation are selected so as to create a pattern in a radiation as a function of wavelength detected by the remotely located sensor to spectrally calibrate the remotely located radiation sensor producing a quantitative spectral relationship between the radiation detected at the remotely located sensor and the radiation reflected by the plurality of mirrors.

Another embodiment of the present disclosure provides a method for spectral calibration of a sensor. The method includes disposing a plurality of reflective mirrors on a surface, the mirrors being arranged to reflect radiation from a source of radiation onto a remotely located radiation sensor; reflecting by a first mirror in the plurality of mirrors a first portion of the radiation in a first wavelength toward the remotely located radiation sensor; reflecting by a second mirror in the plurality of mirrors a second portion of the radiation in a second wavelength different from the first wavelength toward the remotely located radiation sensor; and calibrating the remotely located radiation sensor so as to provide a quantitative spectral relationship between the radiation detected at the remotely located sensor and the radiation reflected by the plurality of mirrors.

Yet another embodiment of the present disclosure provides a synthetic target for sensor performance testing. The synthetic target includes a plurality of reflective mirrors configured and arranged to reflect radiation from a source of radiation onto a remotely located radiation sensor. A first mirror in the plurality of mirrors is configured to reflect a first portion of the radiation in a first wavelength toward the remotely located radiation sensor. A second mirror in the plurality of mirrors is configured to reflect a second portion of the radiation in a second wavelength different from the first wavelength toward the remotely located radiation sensor. The plurality of mirrors are configured and arranged to test a performance of the remotely located radiation sensor or to generate synthetic spectra that simulate a spectral signature of natural or man-made materials.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

In the accompanying drawings:

FIGS. 2A-2D show various mirrors having different radii of curvature but having a same base dimension producing different fields-of-regard, according to one embodiment;

FIGS. 3A-3D show various mirrors having different radii of curvature and with different base dimensions to provide a constant field-of-regard, according to one embodiment;

FIGS. 6A-6B depict plots of an effective reflectance as a function of wavelength for a first single mirror and for a plurality of mirrors having the same radius of curvature as the first single mirror or a second single mirror having a larger radius of curvature than the radius of curvature of the first single mirror, respectively, according to another embodiment;

DETAILED DESCRIPTION

Figure 1:
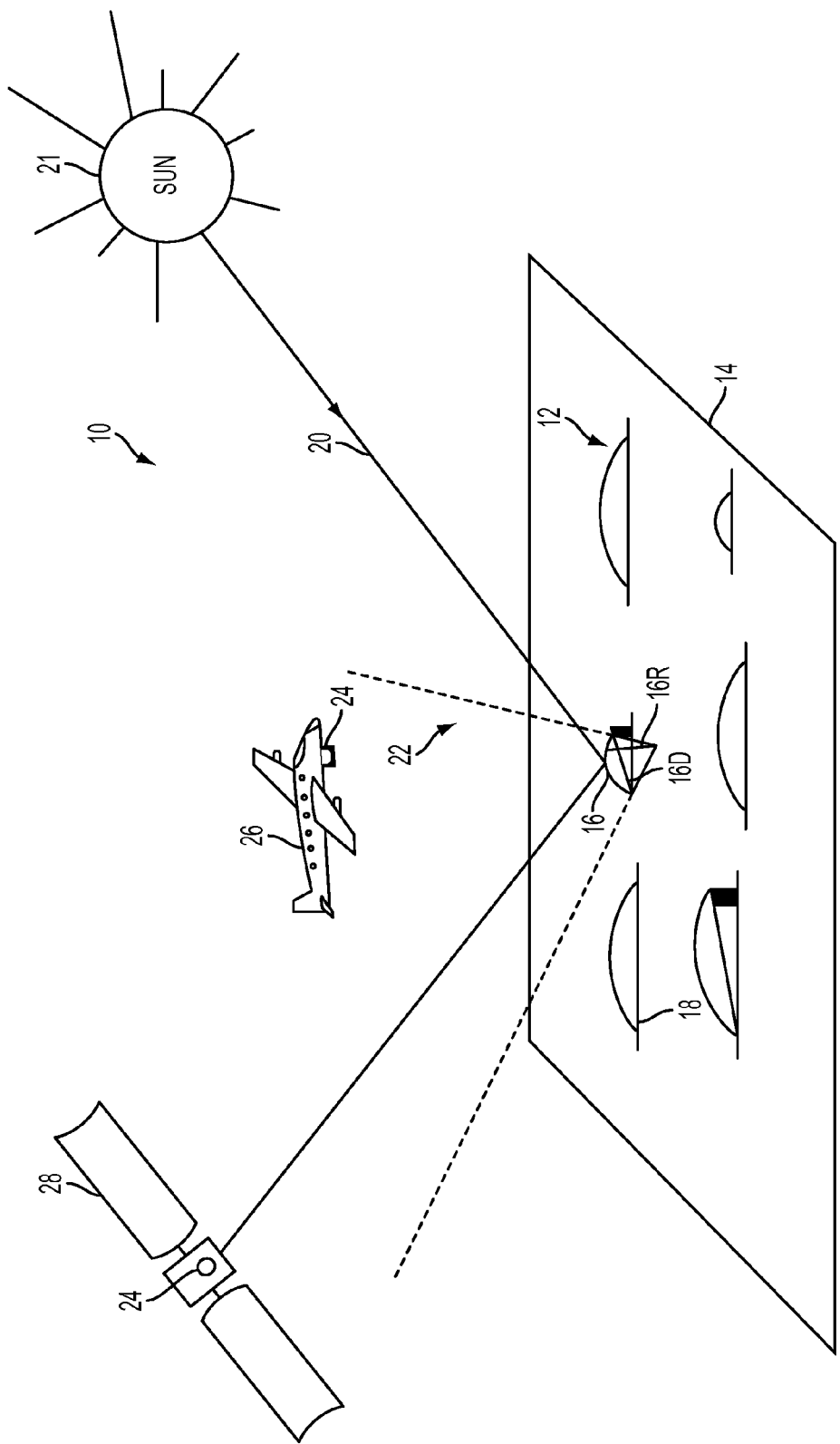
FIG. 1 schematically illustrates a perspective view of a radiometric calibration system 10, according to one embodiment.

FIG. 1 schematically illustrates a perspective view of calibration system 10, according to one embodiment. The calibration system includes a synthetic spectral target comprising a plurality of spherical mirrors 12 disposed upon background 14 so as to provide an array of reflective points upon the ground. For example, mirrors 16 and 18 reflect different intensity of directly incident sunlight 20 emanating from sun 21 due to a different radius of curvature. In one embodiment, background 14 may be a substantially uniform surface such as an asphalt pavement, a concrete area, a uniform grass patch, desert sand, sandy beach, etc. that is on the earth surface. In another embodiment, background 14 can also be in other type of surface that can be provided on an aircraft, a satellite, or a surface of the moon.

In one embodiment, mirrors 12 can have different radii of curvature. For example, mirror 16 has a radius of curvature 16R and a base dimension 16D. The radius of curvature 16R and the base dimension 16D provide field of regard 22. Remote sensor 24 to be calibrated may be provided, for example, on board aircraft 26 or satellite 28. When within the field of regard of one or more of mirrors 12, for example mirror 16, at least a pixel of sensor 24 receives light from one or more mirrors 12, for example mirror 16, as depicted in FIG. 1.

Mirrors 12 may have different radii of curvature and dimensions, and as such different individual fields of regard. Each mirror 12 may be concave, convex, or flat. In the embodiment shown in FIG. 1, each mirror 12 is convex. Any mirror 12, for example mirror 16, can be angled relative to background 14 to direct a cone of radiation (field-of-regard) emanating from sun 21 (the source of radiation) toward sensor 24. For example, this can be accomplished, by raising one side of mirror 16, such as via an adjustable or static structure.

There are various ways to modulate or control the radiance that is received by sensor 24. One way to control the radiance is to control the reflectance of each mirror (e.g., mirror 16). By selecting a highly reflective surface for mirror 16, the radiance can be increased and conversely by selecting a less reflective surface of mirror 16, the radiance can be decreased. Another way to control the radiance is by changing the curvature or radius of one or more mirrors 12 (e.g., mirror 16). By providing mirror 16 with a larger radius of curvature an increased radiance can be obtained and by providing mirror 16 with a smaller radius of curvature the radiance can be decreased. Furthermore, the radius of curvature of any mirror in the plurality of mirrors 12 (e.g., mirror 16 or mirror 18) can be varied for example by bending the mirror using an actuator. A further way is to select the number of mirrors 12. For example, by selecting a larger plurality of mirrors 12, the radiance may be increased while selecting a smaller plurality of mirrors 12, the radiance received by sensor 24 may be decreased.

As it can be appreciated, a mirror brightness, for example brightness of mirror 16, can be increased or decreased relative to a brightness of background 14. This can be performed by controlling the reflected intensity by any of the methods described above. Furthermore, a brightness of mirror such as mirror 16 can be selected without changing the physical size or base dimension 16D of mirror 16. The term "effective reflectance" of a mirror target represents a net reflectance factor that produces an at-sensor direct solar radiance spectrum by an ideal (lossless) and diffuse (Lambertian) standard surface equivalent in brightness to that of the mirror target over the same spectral range, the same surface area (fill factor), and irradiated and viewed under the same geometry and atmospheric conditions. That is, the effective reflectance spectrum is the synthesized Lambertian reflectance spectrum produced by the mirror targets.

FIGS. 2A-2D show various mirrors having different radii of curvature but having a same base diameter or base dimension, according to one embodiment. For example, mirror M1 shown in FIG. 2A has a radius of curvature R1 and base diameter D1; mirror M2 shown in FIG. 2B has a radius of curvature R2 and base diameter D2, mirror M3 shown in FIG. 2C has a radius of curvature R3 and base diameter D3; and mirror M4 shown in FIG. 2D has a radius of curvature R4 and base diameter D4. As shown in FIGS. 2A-2D; radius of curvature R1 of mirror M1 is greater than radius of curvature R2 of mirror M2 which is greater than radius of curvature R3 of mirror M3 which is greater than radius of curvature R4 of mirror R4, as follows R1>R2>R3>R4. However, base diameters D1, D2, D3 and D4 of mirrors M1, M2, M3 and M4 are substantially the same, as follows D1=D2=D3=D4. As depicted in FIGS. 2A-2D, mirror M1 provides radiance L1, mirror M2 provides radiance L2, mirror M3 provides radiance L3, and mirror M4 provides radiance L4. Mirror M1 having radius of curvature R1 provides a narrow cone angle of reflected radiation and as the radius of curvature decreases in mirrors M2, M3 and M4, the cone angle of reflected radiation increases. The radiance increases, for mirrors with equal base diameter, with decreasing cone angle. As a result, radiance L1 is greater than radiance L2 which is greater than radiance L3 which is greater than radiance L4, as follows L1>L2>L3>L4. Therefore, for mirrors having substantially the same dimension, the radiance decreases with decreasing radius of curvature and vice-versa, the radiance increases with increasing radius of curvature. Therefore, an intensity of the radiation reflected by mirrors 12 and recorded at sensor 24 as radiance can be decreased or increased by, respectively, decreasing or increasing a radius of curvature of one or more mirrors 12.

FIGS. 3A-3D shows various mirrors having different radii of curvature and with difference dimensions, according to one embodiment. For example, mirror M1 shown in FIG. 3A has radius of curvature R1 and base diameter D1; mirror M2 shown in FIG. 3B has radius of curvature R2 and base diameter D2; mirror M3 shown in FIG. 3C has radius of curvature R3 and base diameter D3; and mirror M4 shown in FIG. 3D has radius of curvature R4 and base diameter D4. As shown in FIGS. 3A-3D, radius of curvature R1 of mirror M1 is greater than radius of curvature R2 of mirror M2 which is greater than radius of curvature R3 of mirror M3 which is greater than radius of curvature R4 of mirror R4, as follows R1>R2>R3>R4. Also, as shown in FIGS. 3A-3D, base diameter D1 of mirror M1 is greater than base diameter D2 of mirror M2 which is greater than base diameter D3 of mirror M3 which is greater than base diameter D4 of mirror R4, as follows D1>D2>D3>D4. As depicted in FIGS. 3A-3D, mirror M1 provides radiance L1, mirror M2 provides radiance L2, mirror M3 provides radiance L3, and mirror M4 provides radiance L4. In this example, the cone angles of the radiation reflected by the mirrors M1, M2, M3 and M4 is substantially the same for all mirrors M1, M2, M3 and M4. Therefore, the base diameter or dimension D (i.e., D1, D2, D3 and D4) is selected based on radius R (i.e., R1, R2, R3 and R4) to achieve equal cone areas for all mirrors. In other words, by increasing a radius of curvature a mirror while correspondingly increasing a dimension of the mirror, the cone angles can be maintained constant. However, since the radiance depends on the radius of curvature R and does not depend on the base diameter or base dimension D, similarly to the above case, the radiance L1 is also greater than the radiance L2 which is greater than the radiance L3 which is greater than the radiance L4, i.e., L1>L2>L3>L4.

Figure 4A:
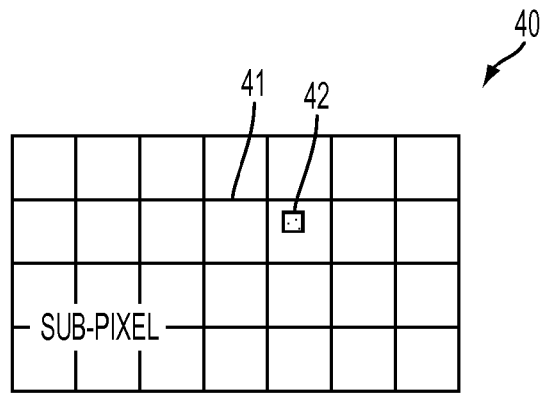
FIGS. 4A-4C show various configurations for imaging of targets or mirrors on a sensor, according to various embodiments.
Figure 4B:
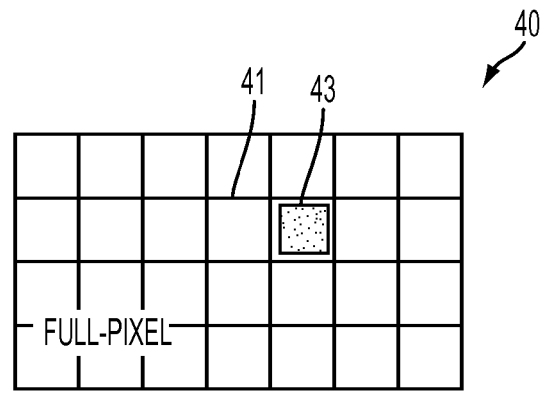
Figure 4C:
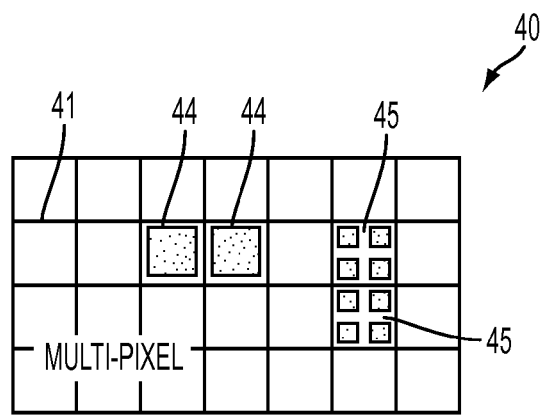

FIGS. 4A-4C show various configurations for imaging of targets or mirrors on a sensor, according to various embodiments. Grid 40 in FIGS. 4A-4C represent a grid of pixels within the detector or sensor. Each square 41 in grid 40 represents a pixel. FIG. 4A shows targets or mirrors that are imaged into a portion of pixel 42. The physical extent of a target fills portion 42 of pixel 41. In other words, an image of the target occupies portion 42 of pixel 41. FIG. 4B shows targets or mirrors that are imaged into a whole area of pixel 43. The physical extent of a target fills substantially whole area 43 of pixel 41. In other words, the image of the target or targets occupies substantially whole pixel 41. FIG. 4C shows targets or mirrors that are imaged into a plurality of pixels 41. For example, an array of images 44 of an array of targets can fill one pixel 41, or an array of images 44 can fill a plurality of pixels 41.

Sensor or detector 24 can detect radiation in various wavelengths or wavelength ranges including the wavelength range between about 0.4 μm and about 15 μm which includes the visible range (between about 0.4 μm and about 0.7 μm), the near infrared range (between about 0.7 μm and about 1.4 μm), the short wavelength infrared (SWIR) range (between about 1.4 μm and about 3 μm), the mid-wavelength infrared (MWIR) range (between about 3 μm and about 8 μm) and at least a portion of the long-wavelength infrared (LWIR) range (between about 8 μm and about 15 μm).

Therefore, sensor or detector 24 can be calibrated to provide a quantitative measure of radiance of various targets, but can also be calibrated spectrally at various wavelengths or wavelength ranges. This can be particularly beneficial if sensor 24 is a multispectral or hyperspectral sensor that samples the color or spectral properties of the radiation in a scene or object. In order to calibrate the sensor spectrally and/or to validate sensor performance, controlled detection experiment and vicarious characterization of the sensor spectral response is performed by providing synthetic wavelength dependent reflectance targets (e.g., using one or more mirrors). Hence, synthetic wavelength dependent reflectance targets or spectral are generated so as to provide a desired radiation spectral input to the sensor. Spectral targets are generated and used to vicariously measure sensor relative spectral response (RSR) or to simulate a spectral signature of natural or manmade materials. In spectral calibration, RSR is measured or validated by recording the magnitude of the detector response to narrow or nearly monochromatic wavelength intervals reflected by the mirrors and that known spectral features are reported by the sensor at the correct wavelength. In addition, the spectral calibration further determines whether the RSR is shift invariant. That is the spectral calibration checks whether the RSR varies when targets are viewed at different parts of the field of view. Once the spectral calibration is accomplished, performance validation is carried out by evaluating the ability to detected synthetic targets imbedded in a background of known pixel fill fraction and signal-to-clutter ratio. Each target (e.g., one or more mirrors) can be provided with a unique and narrow spectral band-pass or reflectance wavelength range. A reference spectrum can be selected to test sensor detection performance against target of known fill fraction and signal-to-clutter ratio. Mirrors can be tuned to synthesize targets with a desired spectrum. A plurality of generated targets can be imaged in different parts of a field of view (FOV) of the sensor to determine sensor spectral response properties.

In the following paragraphs some mathematical formulae are provided to provide a quantitative evaluation of the spectral radiance. However, as it can be appreciated, these formulae provided below are only one set of formulae that can be used to quantify the spectral radiance. As it can be appreciated other mathematical expressions or variations of these formulae can be used to describe and quantify the spectral radiance in accordance with various embodiments. In the following formulae, it is assumed for simplicity that the sensor has an identical horizontal and vertical ground sample distance GSD, and the background reflectance is assumed to be a diffuse Lambertian while the reflectance of a mirror is assumed to be specular.

A total at-sensor spectral radiance can be written as follows:

$$L_{at\text{-}sensor}(\lambda) = L_{bkgd}(\lambda) + L_{target}(\lambda) + L_{atm}(\lambda) \quad (1)$$

where $L_{bkgd}$ corresponds to the background spectral radiance, $L_{atm}$ correspond to the atmospheric path spectral radiance and $L_{target}$ corresponds to the target spectral radiance.

The background spectral radiance can be expressed as follows:

$$L_{bkgd}(\lambda) = \frac{E_{sun}(\lambda)\cos\phi_{SZA}}{\pi}\rho_{bkgd}(\lambda)\eta_{target}\left[\tau_\downarrow(\lambda) + \frac{G(\lambda)}{1-G(\lambda)}\right]\tau_\uparrow(\lambda) \quad (2)$$

$$\text{where } \eta_{target} = \left(1 - \frac{A_{target}}{GSD^2}\right) \quad (3)$$

The synthesized target spectral radiance can be written as follows:

$$L_{target}(\lambda) = \frac{E_{sun}(\lambda)}{4GSD^2}\tau_\downarrow(\lambda)\tau_\uparrow(\lambda)\sum_{j=1}^{N}\rho_{mirror,j}(\lambda, \theta_i)R^2_{mirror,j} \quad (4)$$

Where:
$L_{at\text{-}sensor}(\lambda)$ is the at-sensor spectral radiance [W/m²/sr/nm],
$L_{bkgd}(\lambda)$ is the background spectral radiance [W/m²/sr/nm],
$L_{target}(\lambda)$ is the target spectral radiance [W/m²/sr/nm],
$L_{atm}(\lambda)$ is the atmospheric path spectral radiance [W/m²/sr/nm],
$E_{sun}(\lambda)$ is the solar exo-atmospheric spectral irradiance [W/m/nm],
$\phi_{SZA}$ is the solar zenith angle [radians],
$\tau_\downarrow(\lambda)$ is the downward path atmospheric transmittance,
$\tau_\uparrow(\lambda)$ is the upward path atmospheric transmittance,
$G(\lambda)$ is the diffuse-to-global ratio,
$\rho_{bkgd}(\lambda)$ is the background reflectance factor,
$\eta_{target}$ is the target area fill factor efficiency,
GSD is the sensor ground sample distance [m],
N is the number of mirrors,
$A_{target}$ is the target area [m²],
$\rho_{mirror,j}$ is the reflectance of the jth mirror,
$R_{mirror,j}$ is the radius of curvature of the jth mirror, and
$\theta_i$ is the angle of incidence.

For example, in one embodiment, the diffuse-to-global ratio $G(\lambda)$ can be assumed to be equal to zero for simplicity. In which case, a ratio of target-to-background radiance can be expressed as follows:

$$K(\lambda) = \frac{L_{target}(\lambda)}{L_{bkgd}(\lambda)} \quad (5)$$

Using expressions (2), (3) and (4), the ratio of target-to-background radiance $K(\lambda)$ can be written as follows:

$$K(\lambda) = \frac{\frac{1}{4GSD^2}\sum_{j=1}^{N}\rho_{mirror,j}(\lambda, \theta_i)R^2_{mirror,j}}{\frac{\cos\phi_{SZA}}{\pi}\rho_{bkgd}(\lambda)\left(1 - \frac{A_{target}}{GSD^2}\right)} \quad (6)$$

Expression (6) can be transformed into the following expression:

$$K(\lambda) = \frac{\frac{\pi}{4}\sec\phi_{SZA}\sum_{j=1}^{N}\rho_{mirror,j}(\lambda, \theta_i)R^2_{mirror,j}}{\rho_{bkgd}(\lambda)(GSD^2 - A_{target})} \quad (7)$$

The background reflectance factor $\rho_{bkgd}(\lambda)$ and the sensor ground sample distance GSD are not controllable by a user. The reflectance of the jth mirror $\rho_{mirror,j}$, the radius of curvature of the jth mirror $R_{mirror,j}$, the number of mirrors N, and the target area $A_{target}$ are all parameters that can be selected by the user.

In Table 1 is provided an example showing the flexibility in selecting mirror parameters to provide the same effective fill factor for various cases, all assuming a solar zenith angle of 0 radians. In this example, the achieved fill factor of the target is about 20% by area (i.e., one part target and 4 parts background). Table 1 also shows the desired output ratio of target-to-background radiance $K(\lambda)$.

TABLE 1

| Parameter | Unit | Case 1 | Case 2 | Case 3 |
|---|---|---|---|---|
| $\rho_{bkgd}(\lambda)$ | — | 0.25 | 0.25 | 0.25 |
| GSD | m | 2.0 | 2.0 | 2.0 |
| $\rho_{mirror,j}$ | — | 0.75 | 0.50 | 0.70 |
| N | mirrors | 8 | 8 | 15 |
| $R_{mirror,j}$ | m | 0.20 | 0.25 | 0.15 |
| $A_{target}$ | m$^2$ | 1.0 | 1.0 | 1.0 |
| $K(\lambda)$ | — | 0.25 | 0.25 | 0.25 |

Figure 5A:
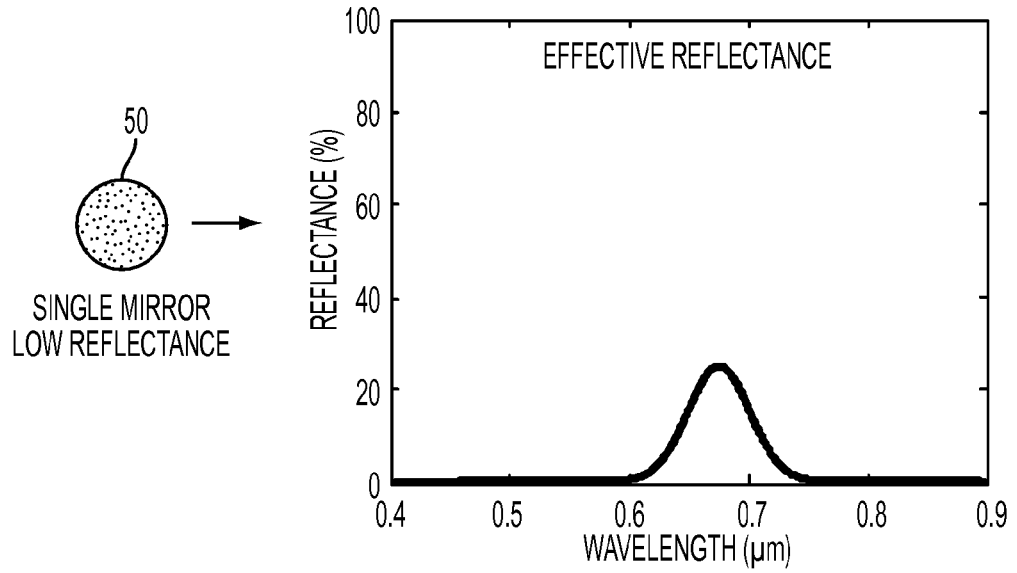
FIGS. 5A-5B depict plots of an effective reflectance as a function of wavelength of a lower reflectance mirror and a higher reflectance mirror, respectively, according to one embodiment.
Figure 5B:
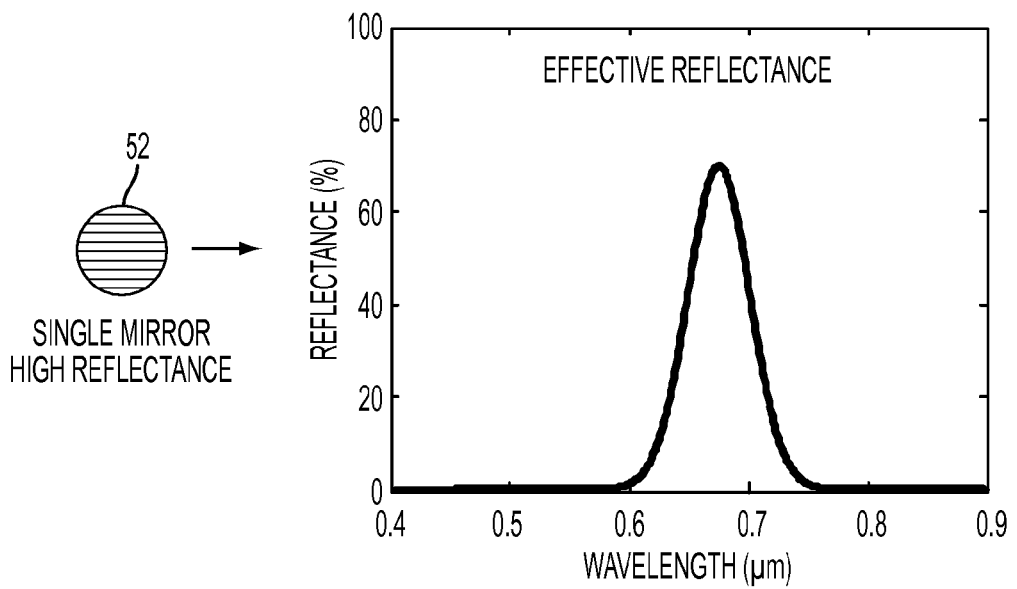

FIGS. 5A-5B depict plots of an effective reflectance as a function of wavelength of a lower reflectance mirror and a higher reflectance mirror, respectively, according to one embodiment. FIG. 5A shows a plot of a reflectance as a function of wavelength of radiation for a single mirror 50 having a lower reflectance. Next to this plot single mirror 50 is shown having a lower reflectance. FIG. 5B shows a plot of a reflectance as a function of wavelength of radiation for a single mirror 52 having a higher reflectance. Next to this plot single mirror 52 is shown having a higher reflectance. As can be seen in FIGS. 5A and 5B, the wavelength range detected by the lower reflectance mirror and the higher reflectance mirror are substantially the same. However, the at-sensor radiance is higher in the case of the mirror having a higher reflectance than the at-sensor radiance in the case of the mirror having a lower reflectance. This shows that the at-sensor radiance can be controlled by selecting mirrors having different reflectance.

FIGS. 6A-6B depict plots of an effective reflectance as a function of wavelength for a first single mirror, and for a plurality of mirrors having the same radius of curvature as the first single mirror or a second single mirror having a larger radius of curvature than the radius of curvature of the first single mirror, respectively, according to another embodiment. FIG. 6A shows a plot of a reflectance as a function of wavelength of radiation for first single mirror 60 having a first radius of curvature. Next to this plot is shown single mirror 50. FIG. 6B shows a plot of a reflectance as a function of wavelength of radiation for a plurality of mirrors 62 having the same first radius of curvature as the first single mirror 60, or for a second single mirror 64 having a second radius of curvature greater than a radius of curvature of the first single mirror. Next to this plot are shown plurality of mirrors 62 and second single mirror 64. As can be seen in FIGS. 6A and 6B, the wavelength range detected by the first single mirror and the plurality of mirrors or the second mirror are substantially the same. However, the radiance detected at sensor is higher in the case of the plurality of mirrors or in the case of the second mirror than the radiance detected at sensor in the case of the first single mirror. This shows that the at-sensor radiance can be controlled by the number of mirrors or by the curvature of the mirror, or both.

Figure 7A:
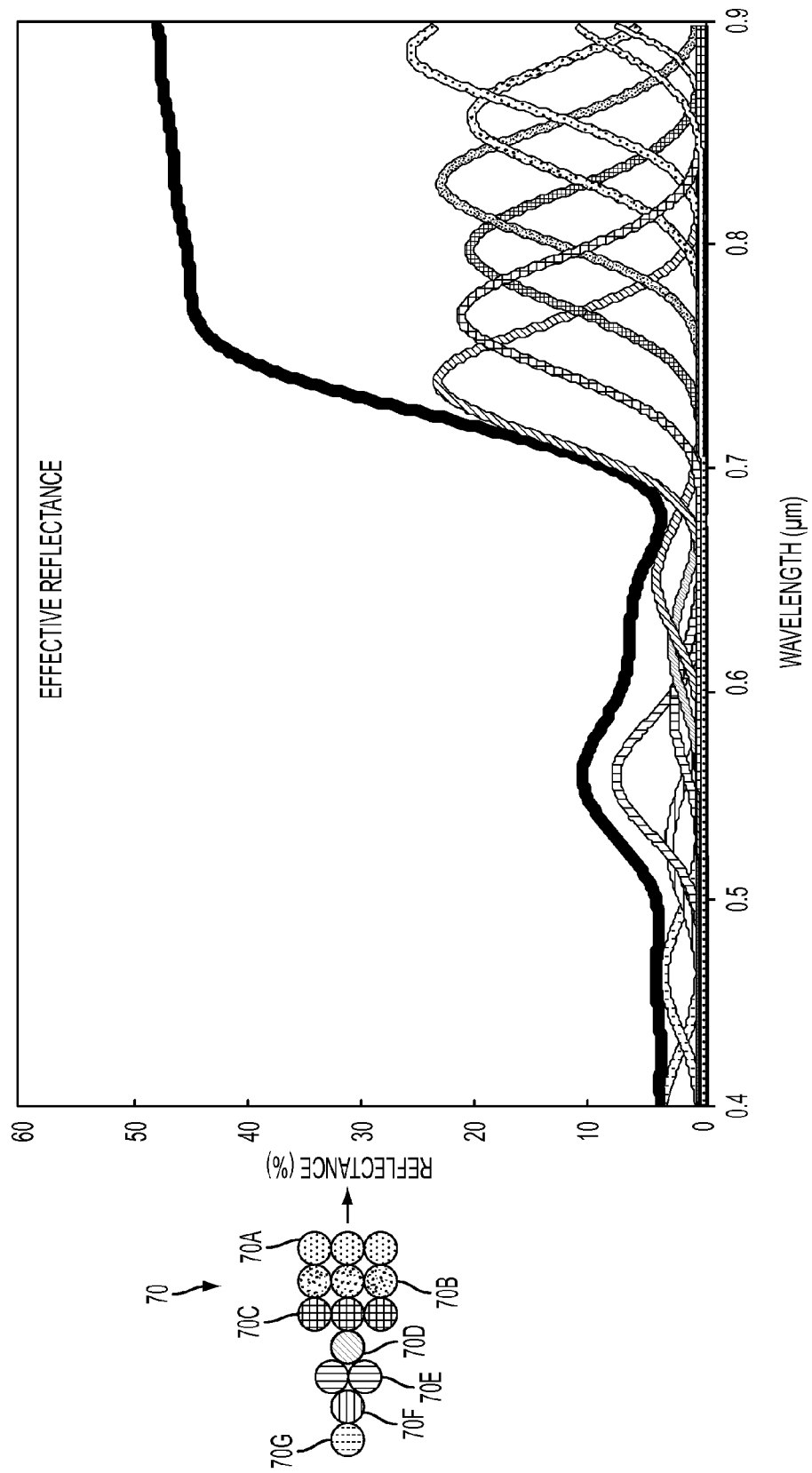
FIG. 7A depicts a series of plots of an effective reflectance of plurality of mirrors, that synthesize a vegetation spectrum, having a same radius of curvature as a function of wavelength, according to one embodiment.

FIG. 7A depicts a series of plots of an effective reflectance of plurality of mirrors 70 having a same radius of curvature as a function of wavelength, according to one embodiment. Plurality of mirrors 70 are shown next to the plot. Plurality of mirrors 70 includes mirrors having different reflective color surface. For example, mirrors 70 include three mirrors 70A of a first color, three mirrors 70B of a second color 70B, three mirrors 70C of a third color, one mirror 70D of a fourth color, two mirrors 70E of fifth color, one mirror 70F of a sixth color and one mirror 70G of a seventh color. All mirrors 70A, 70B, 70C, 70D, 70E, 70F and 70G have substantially the same radius of curvature. Each mirror or group of mirrors 70A, 70B, 70C, 70D, 70E, 70F and 70G reflect radiation towards sensor at a specific wavelength range. The sensor (or specifically a single pixel within the sensor) detects a total radiation reflected from all mirrors. Radiation at each specific wavelength range reflected by each mirror is summed to provide the total radiation. Therefore, by selecting a number of mirrors reflecting at specific wavelength ranges, the total radiation spectrum or radiance as a function of wavelength detected by the single pixel within the sensor can be modified or tuned. In the above example, although the various mirrors having various reflective color surfaces are configured as shown in FIG. 7A, as it can be appreciated, the various mirrors with various surface colors can be configured in any desired manner and any number of mirror with any desired color can be used to construct, create or synthesize a desired radiation spectrum. The example provided above depicts the synthesis of a vegetation spectrum. However, as it can be appreciated, a spectrum of any object (e.g., a car, a building, sand, etc.) can be synthesized.

Figure 7B:
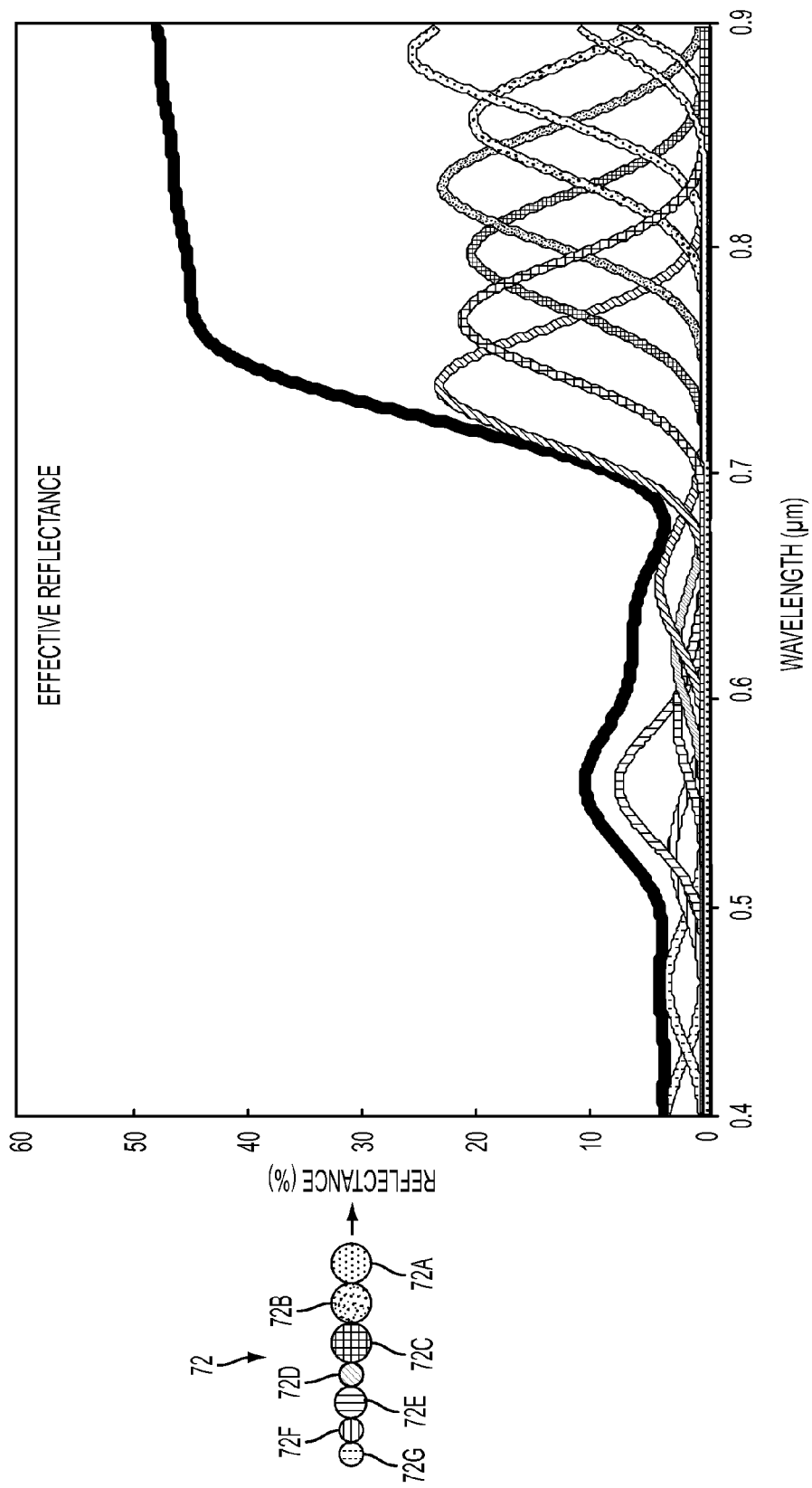
FIG. 7B depicts a series of plots of an effective reflectance of plurality of mirrors, that synthesize a vegetation spectrum, having different radii of curvature as a function of wavelength, according to one embodiment.

FIG. 7B depicts a series of plots of an effective reflectance of plurality of mirrors 72 having different radii of curvature as a function of wavelength, according to one embodiment. Plurality of mirrors 72 are shown next to the plot. Plurality of mirrors 72 includes mirrors having different reflective color surface. For example, mirrors 72 include mirror 72A of a first color having a first radius of curvature, mirror 72B of a second color having the first radius of curvature, mirror 72C of a third color having the first radius of curvature, mirror 72D of a fourth color having a second radius of curvature, mirrors 72E of fifth color having third radius of curvature, mirror 72F of a sixth color having the first radius of curvature and mirror 72G of a seventh color having the first radius of curvature. Each mirror 72A, 72B, 72C, 72D, 72E, 72F and 72G reflects radiation towards the sensor at a specific wavelength range. The sensor (or specifically a single pixel within the sensor) detects a total radiation reflected from all mirrors. Radiation at each specific wavelength range reflected by each mirror is summed to provide the total radiation. Therefore, by selecting a number of mirrors reflecting at specific wavelength ranges and having different radii of curvature, the total radiation spectrum or radiance as a function of wavelength detected by the single pixel within the sensor can be modified or tuned. The example provided above depicts the synthesis of a vegetation spectrum. However, as it can be appreciated, a spectrum of any object (e.g., a car, a building, sand, etc.) can be synthesized.

As shown in FIGS. 7A and 7B, a same radiation spectrum is achieved either by using integer multiples of mirrors reflecting different colors (as shown in FIG. 7A), or single mirrors of different radii of curvature reflecting different colors (as shown in FIG. 7B), or both.

Figure 8A:
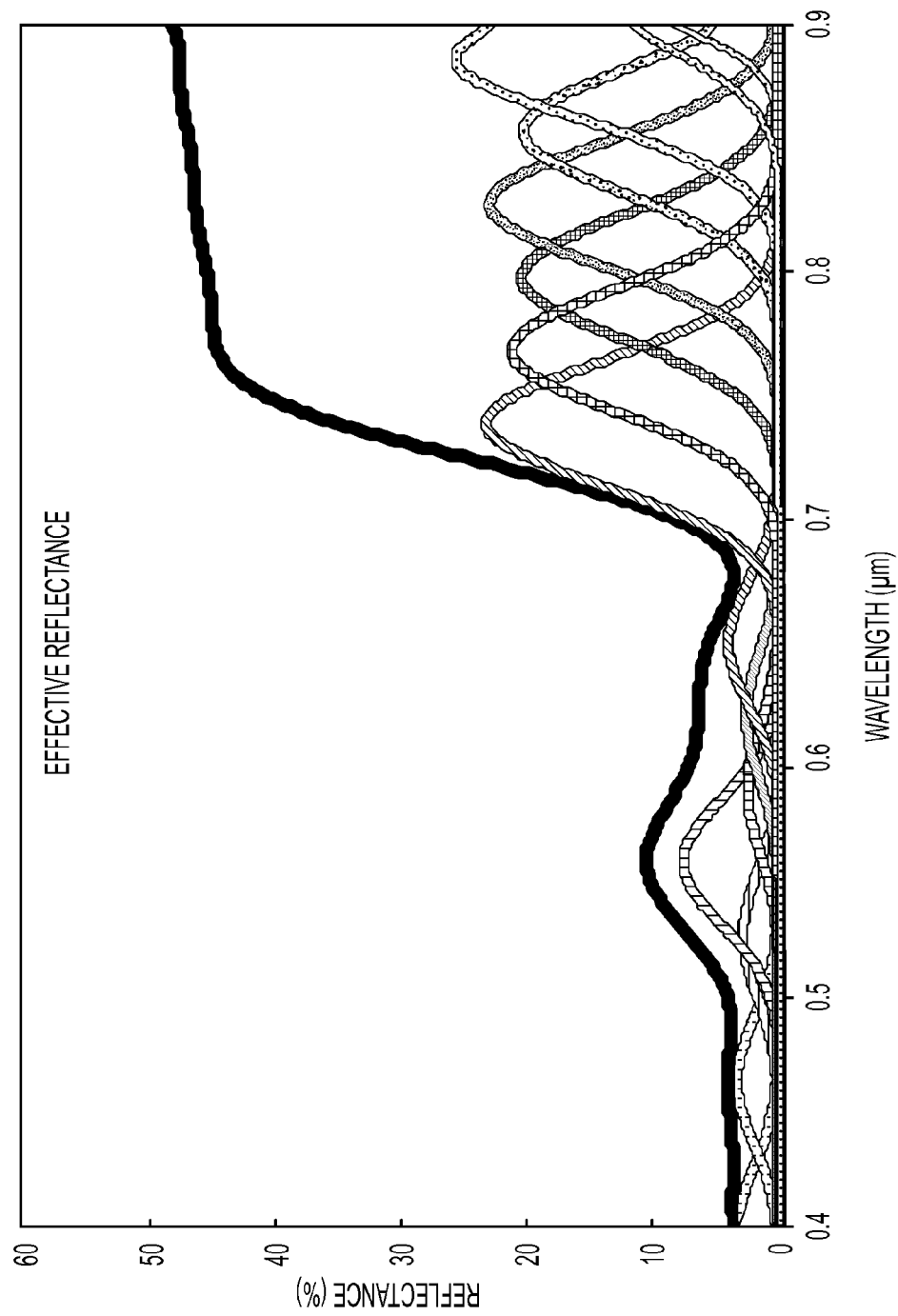
FIG. 8A depicts a series of plots of an effective reflectance of a plurality of mirrors, that synthesize a vegetation spectrum, as a function of wavelength, according to one embodiment.

FIG. 8A depicts a series of plots of an effective reflectance of a plurality of mirrors as a function of wavelength, according to one embodiment. As shown in FIG. 8A, the radiation reflected by each of the mirrors has a different wavelength range. However, the wavelength range or bandwidth of the radiation reflected by each of the mirrors is substantially the same.

Figure 8B:
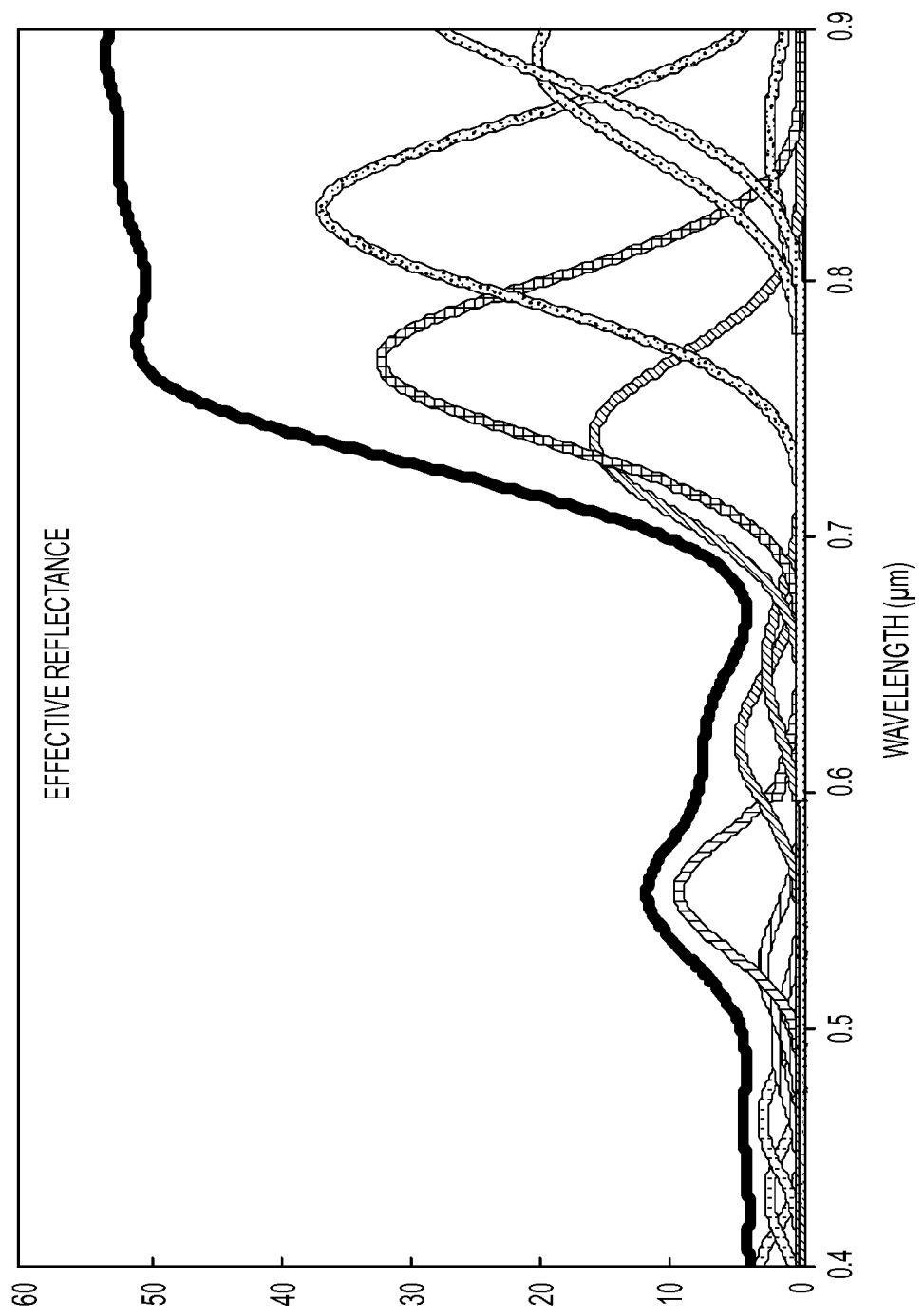
FIG. 8B depicts a series of plots of an effective reflectance of a plurality of mirrors as a function of wavelength, according to another embodiment.

FIG. 8B depicts a series of plots of an effective reflectance of a plurality of mirrors as a function of wavelength, according to another embodiment. As shown in FIG. 8B, the radiation reflected by each of the mirrors has a different wavelength range. In addition, the wavelength range or bandwidth of the radiation reflected by each of the mirrors is also different. In FIG. 8B, the wavelength range or bandwidth for each spectrum is equal to the center wavelength of each radiation spectrum divided by a constant (for example 10), i.e., constant spectral resolving power. For example, the wavelength bandwidth for a radiation spectrum (at a first wavelength range) centered around 0.55 μm (550 nm) is about 55 nm. Similarly, the wavelength bandwidth for a radiation spectrum (at a second wavelength range) centered around 0.75 μm (750 nm) is about 75 nm. Hence, a bandwidth of the second wavelength range is greater than a bandwidth of the first wavelength range. Therefore, in this case, the bandwidth increases or widens with increasing wavelength center of radiation spectrum. For example, this feature can be used to select appropriate number of mirrors reflecting different colors to simulate a total radiation spectrum of a target. For example, a relatively smaller number of mirrors can be used to simulate the longer wavelength portion of the radiation (e.g., the red portion of the visible spectrum) of a target while a relatively greater number of mirrors can be used to simulate the shorter wavelength portion of the radiation (e.g., the blue portion of the visible spectrum) of the target.

Figure 9A:
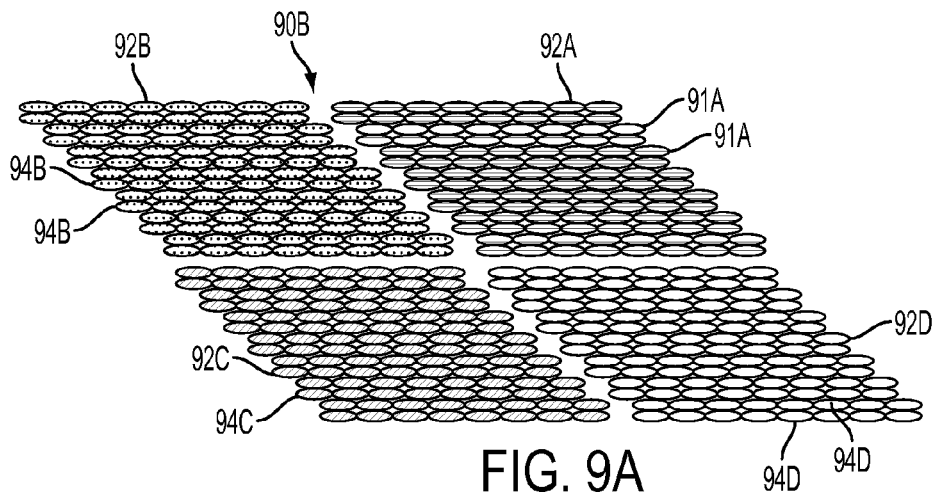
FIG. 9A schematically depicts synthesized targets using a series of colored mirrors reflecting different colors provided within sheets to simulate a desired radiation spectrum, according to one embodiment.

FIG. 9A schematically depicts synthesized targets using a series of colored mirrors reflecting different colors provided within sheets to simulate a desired radiation spectrum, according to one embodiment. As shown in FIG. 9A, target 90 comprises a plurality of sheets 92A, 92B, 92C and 92D. Sheet 92A includes plurality of mirrors 94A. Sheet 92B includes plurality of mirrors 94B. Sheet 92C includes plurality of mirrors 94C. Sheet 92D includes plurality of mirrors 94D. In one embodiment, each sheet 92A-92D has different color. Therefore, each sheet reflects a different radiation spectrum. Although, four sheets are shown in FIG. 9A, as it can be appreciated any number of sheets with any color combination can be provided. In FIG. 9A, the sheets 92A, 92B, 92C and 92D can be combined to synthesize a radiation spectrum on one or more pixels of the sensor. In one embodiment, the sheets 92A-92D can be made for example of plastic. In another embodiment, the sheets can be made from metal such as a sheet of aluminum in which case for example a colored layer can be applied to one or more mirrors of the sheets. However, other suitable materials can also be used to make the sheets. In one embodiment, the color of each sheet 92A-92D can be imbedded within the sheet, for example imbedded within the plastic from which the sheet is fabricated. In another embodiment the sheets can be coated with a colored coating. In yet another embodiment, a separate layer of color (separate from the reflective mirrors) can be applied on top of the mirrors 94A-94D to provide each sheet with its specific color. By providing sheets 92A-92D, a user can make any sheet size, shape or form, with any desired number of mirrors.

Figure 9B:
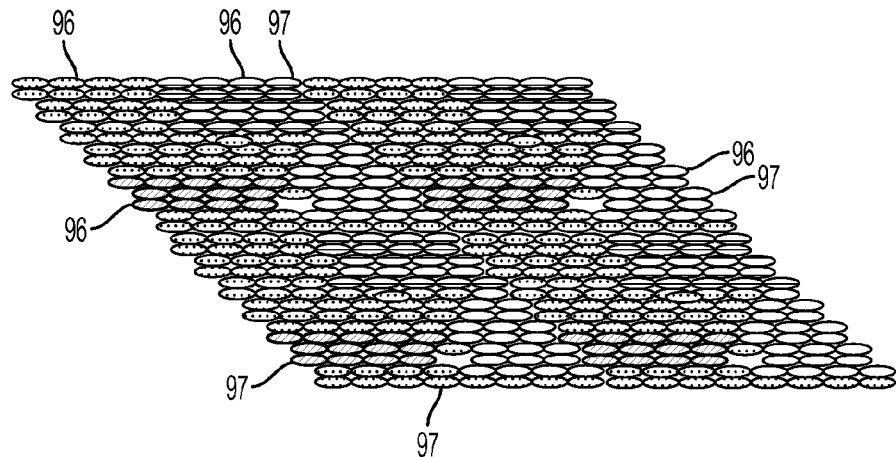
FIG. 9B schematically depicts synthesized targets using a series of interleaved colored mirrors to simulate a desired radiation spectrum, according to one embodiment.

FIG. 9B schematically depicts synthesized targets using a series of interleaved colored mirrors to simulate a desired radiation spectrum, according to one embodiment. In FIG. 9B, sheets 96 with various colors, each sheet comprising a plurality of mirrors 97, are interleaved to provide reflected radiation with a desired radiation spectrum on a pixel of the sensor. FIG. 9B, shows that sheets can be provided with or cut to any desired configuration or number of mirrors.

Figure 9C:
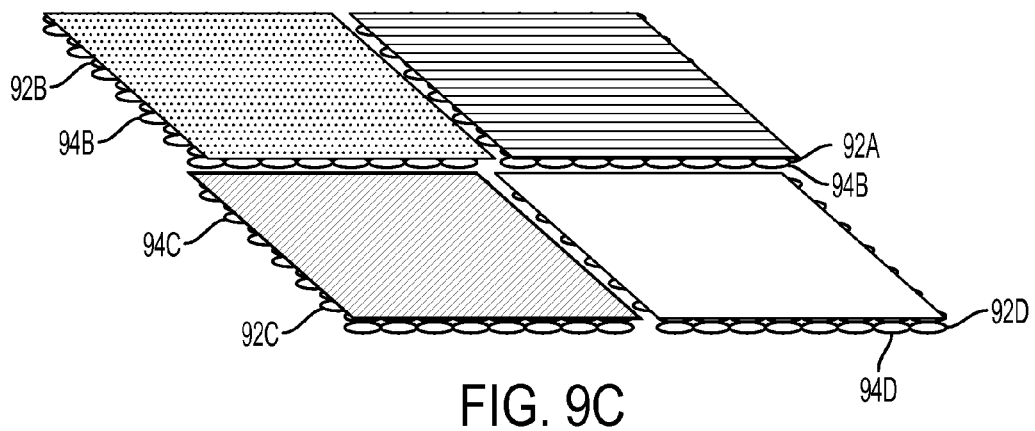
FIG. 9C schematically depicts synthesized targets using a series of mirrors provided within sheets, the sheet being provided with colored layers or filters, to simulate a desired radiation spectrum, according to one embodiment.

FIG. 9C schematically depicts synthesized targets using a series of mirrors provided within sheets, the sheet being provided with colored layers or filters, to simulate a desired radiation spectrum, according to one embodiment. As stated in the above paragraphs, a colored layer can be applied or deposited on top of the sheets 92A-92B to provide each sheet with its specific color.

Figure 10:
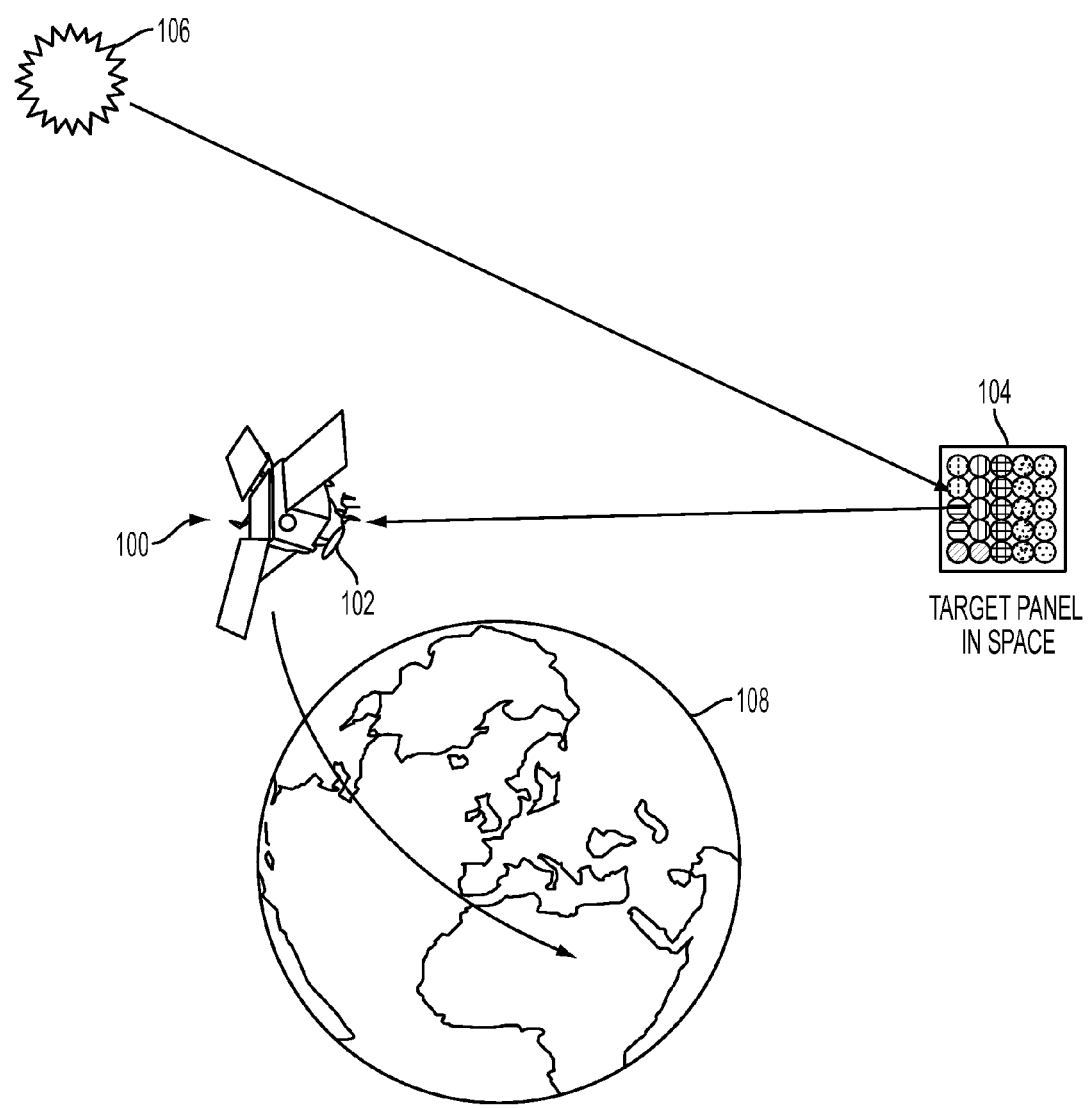
FIG. 10 depicts schematically an example of an implementation for calibrating a detector on a satellite where the target is provided in space, for example, another satellite or the moon, etc., according to one embodiment.

FIG. 10 depicts schematically an example of an implementation for calibrating a detector on a satellite where the target is provided in space, for example, another satellite or the moon, etc., according to one embodiment. As shown in FIG. 10, satellite 100 carrying detector or sensor 102 is calibrated using target 104. As shown, target 104 is provided in space, for example another satellite (not shown). Solar radiation, emitted by sun 106, which includes visible radiation is reflected by target 104 towards detector or sensor 102. By providing a space based target, radiation losses (due to absorption, scattering, etc.) by atmosphere of earth 108, which would otherwise occurs when target 104 is placed on the surface of earth 106, can be eliminated. Furthermore, by providing a space based target detector 102 on satellite 100, detector 102 can also be calibrated at shorter wavelength ranges, such as ultraviolet radiation, which would otherwise be partially blocked or cut by earth's atmosphere when target 104 is placed on the surface of earth 106.

In the above paragraphs, embodiments are described by referring to the radiation reflected by the target (e.g., one or two mirrors) as color. The word "color" is used herein broadly to include any spectral or wavelength band or region of radiation emitted by the source of radiation (e.g., sun) and/or reflected by the target (e.g., one or more mirrors). For example, the term color may refer to the blue light, green light, yellow light, red light or any visible color. However, the term color can also refer to any portion of the infrared (IR) spectrum. In addition, the term color can also refer to radiation in other parts of the spectrum, such as the millimeter wave and/or radio frequency portions. For example, one color can be defined as radiation between about 0.8 and about 1.0 μm, another color can be defined as radiation between about 1.0 μm and about 1.2 μm, a further color can be defined as radiation between about 5.0 and about 7.0 μm, etc. In another example, for instance for target positioned in space, one color can be defined as radiation between about 200 nm and about 250 nm, another color can be defined as radiation between about 250 nm and about 300 nm, another color can be defined as radiation between about 300 nm and 350 nm and another color can be defined as radiation between about 400 nm and about 450 nm, etc.

Therefore, as it can be appreciated, the target or mirrors within the target can be configured to reflect any portion of the wavelength spectrum including, without limitation, the wavelength range between about 0.4 μm and about 15 μm which includes the visible range (between about 0.4 μm and about 0.7 μm), the near infrared (NIR) range (between about 0.7 μm and about 1.4 μm), the short wavelength infrared (SWIR) range (between about 1.4 μm and about 3 μm), the mid-wavelength infrared (MWIR) range (between about 3 μm and about 8 μm) and at least a portion of the long-wavelength infrared (LWIR) range (between about 8 μm and about 15 μm). The target or mirrors within the target can also be configured to reflect any portion of the wavelength spectrum including the millimeter wave and/or radio frequency portions if so desired.

Furthermore, although the sun is described in the above paragraphs as the source emitting the radiation that is reflected by the target, it is also contemplated that an artificial source such as a lamp or a plurality of lamps (e.g., one or more xenon lamps) can be used.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A system for spectral calibration of a remote sensing sensor, comprising:
a plurality of reflective mirrors configured and arranged to reflect radiation from a source of radiation onto a remotely located radiation sensor,
wherein a first mirror in the plurality of mirrors is configured to reflect a first portion of the radiation in a first wavelength toward the remotely located radiation sensor and a second mirror in the plurality of mirrors is configured to reflect a second portion of the radiation in a second wavelength different from the first wavelength toward the remotely located radiation sensor,
wherein the first portion of the radiation and the second portion of the radiation are selected to calibrate the remotely located radiation sensor so as to provide a quantitative spectral relationship between the radiation detected at the remotely located sensor and the radiation reflected by the plurality of mirrors, and
wherein a cone angle or field-of-regard of the radiation reflected by the plurality of mirrors and measured by the sensor is maintained constant when a radius of curvature of one or more mirrors in the plurality of mirrors is increased and a size of the one or more mirrors in the plurality of mirrors is increased.

2. The system of claim 1, wherein the first portion of the radiation and the second portion of the radiation are combined to create a net upwelling spectrum for spectral calibration and validation of the remote sensing sensor.

3. The system of claim 1, wherein the first mirror has a first radius of curvature and the second mirror has a second radius of curvature different from the first radius of curvature.

4. The system of claim 1, wherein an intensity of the radiation reflected by the plurality of mirrors and measured by the sensor as radiance decreases or increases with, respectively, decreasing or increasing radius of curvature of one or more of the plurality of mirrors.

5. The system of claim 1, wherein a radiance of the radiation reflected by the plurality of mirrors and measured by the sensor increases with increasing reflectance of one or more of the plurality of mirrors.

6. The system of claim 1, wherein a radiance of the radiation reflected by the plurality of mirrors and measured by the sensor increases with an increased number of the plurality of mirrors.

7. The system of claim 1, wherein a radiance of the radiation reflected by the plurality of mirrors and measured by the sensor is controlled by either a number of the plurality of mirrors, or a curvature of one or more mirrors in the plurality of mirrors, or both.

8. The system of claim 1, wherein the first mirror is configured to reflect a first portion of the radiation in a first wavelength range toward the remotely located radiation sensor, and the second mirror in the plurality of mirrors is configured to reflect the second portion of the radiation in a second wavelength range different from the first wavelength range toward the sensor.

9. The system of claim 8, wherein a radiance of the radiation reflected by the plurality of mirrors and measured by the sensor includes a radiance of the first portion of the radiation in the first wavelength range and a radiance of the second portion of the radiation in the second wavelength range.

10. The system of claim 8, wherein a radiance as a function of wavelength of the radiation reflected by the plurality of mirrors is controlled by selecting the first wavelength range of the first portion of the radiation reflected by the first mirror and selecting the second wavelength range of the second portion of the radiation reflected by the second mirror.

11. The system of claim 8, wherein a bandwidth of the first wavelength range is substantially equal to a bandwidth of the second wavelength range.

12. The system of claim 8, wherein a bandwidth of the second wavelength range is greater than a bandwidth of the first wavelength range when a center wavelength of the second wavelength range is greater than a center of the first wavelength range.

13. The system of claim 1, wherein the first wavelength or the second wavelength, or both are selected to be in the wavelength range between approximately 0.4 µm and approximately 15 µm.

14. The system of claim 1, wherein the source of radiation includes the sun, an artificial source of radiation, or any combination thereof 15. The system of claim 1, wherein the remotely located radiation sensor is located on an aircraft or a satellite.

16. The system of claim 14, wherein the target is located on earth surface or a satellite different from the satellite on which the sensor is located.

17. The system of claim 1, wherein the plurality of mirrors are disposed on a substantially uniform background.

18. A method for spectral calibration of a sensor, comprising:
disposing a plurality of reflective mirrors on a surface, the mirrors being arranged to reflect radiation from a source of radiation onto a remotely located radiation sensor,
reflecting by a first mirror in the plurality of mirrors a first portion of the radiation in a first wavelength toward the remotely located radiation sensor;
reflecting by a second mirror in the plurality of mirrors a second portion of the radiation in a second wavelength different from the first wavelength toward the remotely located radiation sensor; and
calibrating the remotely located radiation sensor so as to provide a quantitative spectral relationship between the radiation detected at the remotely located sensor and the radiation reflected by the plurality of mirrors, wherein a cone angle or field-of-regard of the radiation reflected by the plurality of mirrors and measured by the sensor is maintained constant when a radius of curvature of one or more mirrors in the plurality of mirrors is increased and a size of the one or more mirrors in the plurality of mirrors is increased.

19. The method of claim 18, decreasing or increasing a radiance of the radiation reflected by the plurality of mirrors measured by the sensor by, respectively, decreasing or increasing a radius of curvature of one or more of the plurality of mirrors.

20. The method of claim 18, controlling a radiance of the radiation reflected by the plurality of mirrors and measured by the sensor by selecting a number of the plurality of mirrors or selecting a curvature of one or more mirrors in the plurality of mirrors, or both.

21. A synthetic target comprising:
a plurality of reflective mirrors configured and arranged to reflect radiation from a source of radiation onto a remotely located radiation sensor,
wherein a first mirror in the plurality of mirrors is configured to reflect a first portion of the radiation in a first wavelength toward the remotely located radiation sensor and a second mirror in the plurality of mirrors is configured to reflect a second portion of the radiation in a second wavelength different from the first wavelength toward the remotely located radiation sensor, wherein the plurality of mirrors are configured and arranged to test a performance of the remotely located radiation sensor or configured and arranged to generate synthetic spectra that simulate a spectral signature of natural or manmade materials, and wherein a cone angle or field-of-regard of the radiation reflected by the plurality of mirrors and measured by the sensor is maintained constant when a radius of curvature of one or more mirrors in the plurality of mirrors is increased and a size of the one or more mirrors in the plurality of mirrors is increased.

22. The synthetic target of claim 21, wherein the first mirror has a first radius of curvature and the second mirror has a second radius of curvature different from the first radius of curvature.

23. The synthetic target of claim 21, wherein a radiance of the radiation reflected by the plurality of mirrors measured by the sensor decreases or increases with, respectively, decreasing or increasing radius of curvature of one or more of the plurality of mirrors.

24. The synthetic target of claim 21, wherein a radiance of the radiation reflected by the plurality of mirrors and measured by the sensor increases with increasing reflectance of one or more of the plurality of mirrors.

25. The synthetic target of claim 21, wherein a radiance of the radiation reflected by the plurality of mirrors and measured by the sensor increases with an increased number of the plurality of mirrors.

26. The synthetic target of claim 21, wherein a radiance of the radiation reflected by the plurality of mirrors and measured by the sensor is controlled by either a number of the plurality of mirrors, or a curvature of one or more mirrors in the plurality of mirrors, or both.

27. The synthetic target of claim 21, wherein the first mirror is configured to reflect a first portion of the radiation in a first wavelength range toward the remotely located radiation sensor, and the second mirror in the plurality of mirrors is configured to reflect the second portion of the radiation in a second wavelength range different from the first wavelength range toward the sensor.

28. The synthetic target of claim 27, wherein a radiance of the radiation reflected by the plurality of mirrors and measured by the sensor includes a radiance of the first portion of the radiation in the first wavelength range and a radiance of the second portion of the radiation in the second wavelength range.

29. The synthetic target of claim 27, wherein a radiance as a function of wavelength of the radiation reflected by the plurality of mirrors is controlled by selecting the first wavelength range of the first portion of the radiation reflected by the first mirror and selecting the second wavelength range of the second portion of the radiation reflected by the second mirror.

30. The synthetic target of claim 27, wherein a bandwidth of the first wavelength range is substantially equal to a bandwidth of the second wavelength range.

31. The synthetic target of claim 27, wherein a bandwidth of the second wavelength range is greater than a bandwidth of the first wavelength range when a center wavelength of the second wavelength range is greater than a center of the first wavelength range.

32. The synthetic target of claim 21, wherein the first wavelength or the second wavelength, or both are selected to be in the wavelength range between approximately 0.4 μm and approximately 15 μm.

33. The synthetic target of claim 21, wherein the source of radiation includes the sun, an artificial source of radiation, or any combination thereof.

34. The synthetic target of claim 21, wherein the remotely located radiation sensor is located on an aircraft or a satellite.

35. The synthetic target of claim 34, wherein the target is located on earth surface or a satellite different from the satellite on which the sensor is located.

36. The synthetic target of claim 21, wherein the surface on which the plurality of mirrors are disposed has a substantially uniform background.

* * * * *